(12) United States Patent
Brudnicki

(10) Patent No.: US 6,681,589 B2
(45) Date of Patent: Jan. 27, 2004

(54) SPACE SUIT BACKPACK USING SOLID ADSORBENTS FOR CRYOGENIC OXYGEN STORAGE, FREEZEOUT OF CARBON DIOXIDE AND MOISTURE, AND ICE HEAT SINK

(75) Inventor: Myron J. Brudnicki, San Pedro, CA (US)

(73) Assignee: Honeywell International Inc., Morristown, NJ (US)

( * ) Notice: Subject to any disclaimer, the term of this patent is extended or adjusted under 35 U.S.C. 154(b) by 59 days.

(21) Appl. No.: 10/061,559

(22) Filed: Feb. 1, 2002

(65) Prior Publication Data

US 2003/0150232 A1 Aug. 14, 2003

(51) Int. Cl.[7] ............... F25D 23/12; F17C 11/00; A62B 18/10
(52) U.S. Cl. ............ 62/259.3; 62/46.1; 128/201.28
(58) Field of Search ............... 62/259.3, 46.1, 62/50.2; 128/201.21, 201.28

(56) References Cited

U.S. PATENT DOCUMENTS

| | | | | |
|---|---|---|---|---|
| 3,366,107 A | * | 1/1968 | Frantom | 128/201.21 |
| 3,500,827 A | * | 3/1970 | Paine | 128/202.26 |
| 3,635,216 A | * | 1/1972 | Curtis | 128/202.11 |
| 3,717,006 A | * | 2/1973 | Kimmell et al. | 62/46.1 |
| 3,807,396 A | * | 4/1974 | Fischel | 128/201.21 |
| 3,831,594 A | * | 8/1974 | Rein | 128/201.21 |
| 3,941,124 A | * | 3/1976 | Rodewald et al. | 128/201.21 |
| 4,024,730 A | * | 5/1977 | Bell et al. | 62/259.3 |
| 5,092,129 A | | 3/1992 | Bayes et al. | |
| 5,275,642 A | * | 1/1994 | Bassine | 96/149 |
| 5,339,806 A | * | 8/1994 | Beaussant et al. | 128/201.21 |
| 5,361,591 A | | 11/1994 | Caldwell | |
| 5,499,623 A | * | 3/1996 | Pasternack | 128/201.21 |
| 5,511,542 A | * | 4/1996 | Hall | 128/201.21 |
| 6,089,226 A | | 7/2000 | Gier | |
| 2001/0019994 A1 | * | 9/2001 | Chang | 502/416 |

* cited by examiner

Primary Examiner—William C. Doerrler
(74) Attorney, Agent, or Firm—William J. Zak, Jr., Esq.

(57) ABSTRACT

A portable life support system includes a primary oxygen supply in thermal communication with a recirculated ventilation flow from a user. The primary oxygen supply has a solid adsorbent bed made of a molecular sieve that adsorbs oxygen at cryogenic temperatures and desorbs oxygen when heated. The primary oxygen supply freezes carbon dioxide and moisture in the recirculated ventilation flow. A wire mesh is adjacent to the primary oxygen supply to contain frozen carbon dioxide and moisture. A first ice chest is downstream of the primary oxygen supply to condition the temperature and humidity of the recirculated ventilation flow. A liquid cooled garment associated with the suit is in thermal communication with the first ice chest. A ventilation loop receives and delivers the recirculated ventilation flow to the primary oxygen supply, as well as delivers the recirculated ventilation flow from the first ice chest to the suit, whereby pneumatic pressure is supplied to the suit and metabolic oxygen is supplied to the user. A coolant loop is in communication with the liquid cooled garment and first ice chest to regulate suit temperature.

16 Claims, 4 Drawing Sheets

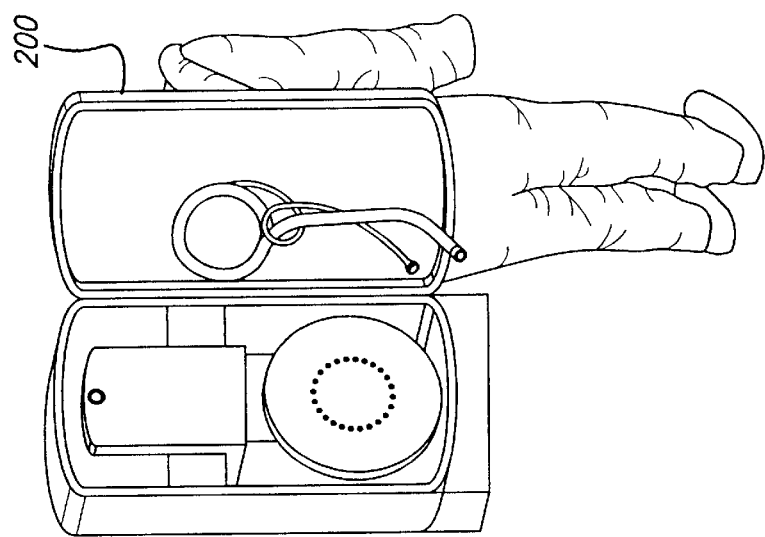
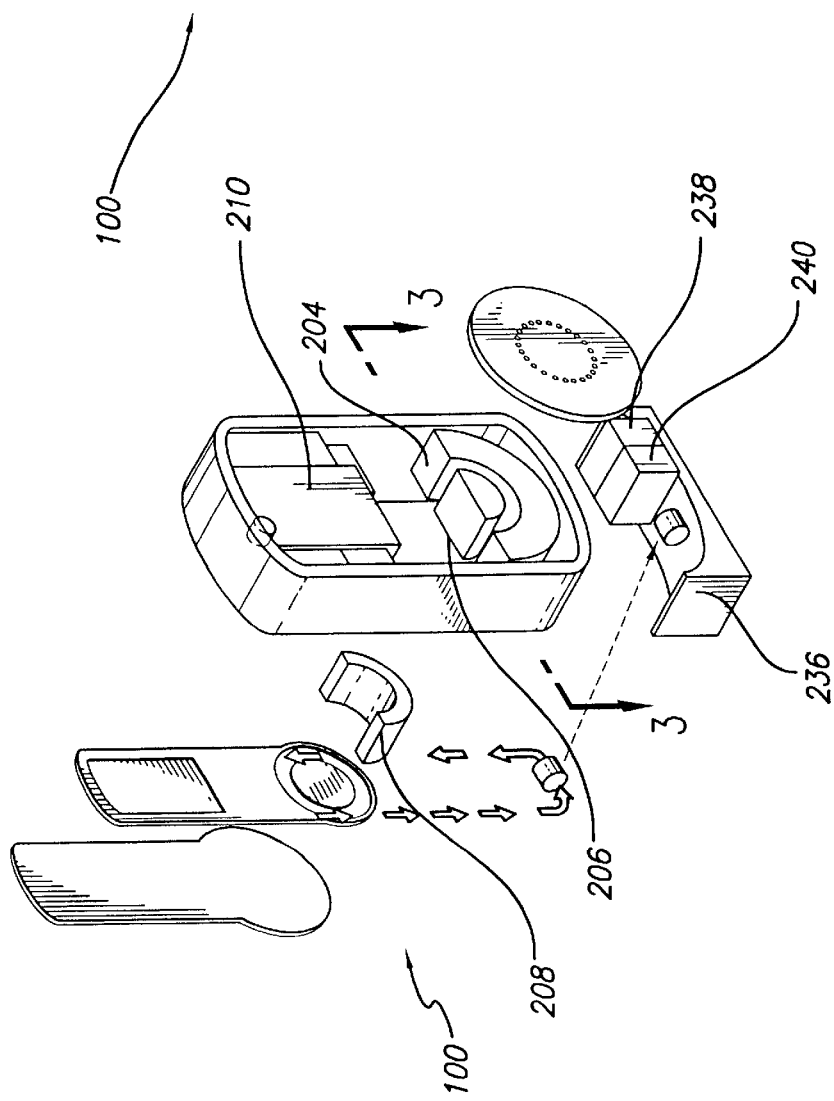
FIG. 1a
FIG. 1b

SPACE SUIT BACKPACK USING SOLID ADSORBENTS FOR CRYOGENIC OXYGEN STORAGE, FREEZEOUT OF CARBON DIOXIDE AND MOISTURE, AND ICE HEAT SINK

BACKGROUND OF THE INVENTION

The present invention generally relates to a portable life support system and, more specifically, to an improved portable life support system using a solid adsorbent bed for the containment and generation of pneumatic and metabolic oxygen and a cold copper wire mesh for the collection and storage of expelled carbon dioxide and moisture.

Space missions often require the need for extravehicular activities (EVA) where the astronaut is placed in the non-atmospheric conditions of space. A life support system is therefore required to sustain the astronaut. Portable life support systems (PLSS) have been designed to allow an astronaut to perform EVA. The PLSS sustains the astronaut through supply of pneumatic pressure and metabolic oxygen, and a heat sink to remove metabolic heat generated by the astronaut during the course of the EVA. Because the astronauts prepare, operate and regenerate the PLSS in the zero gravity conditions of space, a need arises to minimize complexity of the PLSS so that service and maintenance by the astronaut can be easily accomplished. Also, the nature and criticality of space missions require a high degree of safety and reliability for an unlimited number of PLSS life cycles. Furthermore, to make the EVA less cumbersome and more easily performed, the PLSS must be lightweight and compact.

Both high-pressure gaseous and liquid oxygen delivery systems have been heretofore suggested. These systems satisfy to a varying degree many of the needs described above. For example, a heat sink apparatus to remove metabolic heat from an astronaut and to provide space suit cooling is described in U.S. Pat. No. 5,092,129 by Bayes et. al. This invention removes heat from a cooling medium by passing the cooling medium from a spacesuit liquid cooling garment to a heat sink assembly having a heat transfer means and a material for absorbing the heat. The heat transfer means is a thermoelectric array that acts as a heat pump. The heat from the cooling medium is pumped into the material, which isothermally changes phase. Heat is thereby removed from the liquid cooling garment. The system utilizes electrical energy to control the rate of heat rejection to the radiator surface. One of the disadvantages of this system is the consumption of electricity during EVA. The system also does not provide for all the requirements of a complete life support system.

U.S. Pat. No. 5,361,591 by Caldwell describes a portable life support system that provides both temperature regulation and breathable atmosphere using cryogenic technology. Liquid oxygen is freely stored in a dewar for use in this system. Disadvantages with this system include the fact that small quantities of heat are required, such as 92 BTU/lb, to vaporize the oxygen. The heat of vaporization is directly related to the efficiency of the PLSS. Furthermore, a complex system of valves, regulators, heat exchangers and control systems are necessary for proper delivery of the gaseous oxygen. Also, a permanent magnet must be incorporated in the dewar to contain the liquid oxygen and prevent its escape in a zero gravity environment. A separate scrubber is required to remove the expired carbon dioxide, moisture, and perspiration. Such a system adds weight and complexity to the PLSS.

A mixed gas storage and delivery system is described in U.S. Pat. No. 6,089,226 by Gier. Here, mixed gas is expelled from a compact lightweight dewar. Heat exchangers, in association with the dewar, maintain the gas therein in a single phase and provide the needed expulsion energy. Some of the disadvantages with this system are that the mixed gas must be stored at high pressure, such as in excess of 1000 psi. The high-pressure storage presents a considerable safety hazard to the occupant and the handler. A dewar and associated valves, regulators, heat exchanger and delivery system must be of high strength to store, regulate and deliver the mixed gas under such pressure. The heat sink capability of the supercritical mixed gas appears to be less than optimal. It is also not clear that the supercritical storage system provides a breathable atmosphere and removes the bulk of carbon dioxide and water moisture and stores the products for subsequent reclamation of same in the habitat.

As can be seen, there is a need for ease of servicing and maintenance of the PLSS in space. The PLSS must be serviced at the end of each EVA in a relatively short time so that it may be available to support a crew for subsequent EVAs. Use of solid adsorbents for storage of oxygen could be a major step toward simplifying and reducing the maintenance requirements. Since solid adsorbents are capable of many adsorption/desorption cycles, maintenance is virtually eliminated with their use in the PLSS. A solid adsorbent dewar also could simplify the system by eliminating the need for many of the valves, the heat exchanger, transducer, and other tubing and fittings required in current systems. A dewar construction would be adaptable to the design of a simple cluster for containment of oxygen supplies. Collection and storage of expelled carbon dioxide and moisture could be collected for subsequent regeneration and reclamation in the habitat. A cooling system, generated by electrical power, could be simplified by a system that uses ice packets in its stead. With such a system, thawed ice packets could be easily removed and replaced with refrozen ice packets in the habitat between EVAs. The ice packets could contain Velcro in select areas so they could be installed in intimate contact with the item needing heat sinking. Furthermore, thawed ice packets will be easy to handle in a zero gravity environment. Being durable and refreezable, the ice packets could be used repeatedly without loss of water.

SUMMARY OF THE INVENTION

A portable life support system using a solid adsorbent material for storing oxygen at cryogenic temperature comprises a primary oxygen supply having a solid adsorbent bed made of a molecular sieve for containing and desorbing oxygen therefrom upon the presence of heat; a liquid cooled garment, being part of a pressurized garment assembly, including liquid circulating pipes therein for conductively transferring metabolic heat from an astronaut; a liquid cooled garment loop for circulating the liquid in the liquid circulating pipes away from the liquid cooled garment; a heat sink assembly containing ice therein for conditioning the desorbed oxygen and absorbing metabolic heat from the circulating liquid of the liquid cooled garment loop; and a ventilation loop for piping carbon dioxide and moisture exhaust from the astronaut to a breathe out collection and storage device, which provides desorbed oxygen for use as metabolic oxygen and pneumatic pressure for the astronaut's spacesuit.

It is thus an object of the invention to conserve vital resources and thus provide a simple, regenerative method for controlling the rate of heat rejection without the need for consumption of electricity during EVA. The present invention operates to control the heat of the astronaut through a simple ice cube heat sink. A temperature control valve provides the comfort desired by the astronaut. The ice cube heat sink does not consume electricity during EVA and ice packets used with the ice cube heat sink can be refrozen in the habitat and reused.

It is another object of the invention to reduce the complex system of valves and regulators currently needed for converting LOX to gaseous oxygen and to increase the efficiency of converting oxygen to a state where it can be used for cooling and consumption. The present invention provides simplification and efficiency by using a simple canister of solid adsorbent molecular sieve or carbon molecular sieve (CMS) to store the charge of oxygen needed for the EVA. The heat of vaporization of LOX is 92 Btu/lb versus 211 Btu/lb for desorbing oxygen from the solid adsorbent, thus the solid adsorbent pack is much more efficient. CMS has been demonstrated in laboratory to hold 73 wt/wt percent at minus 183 degrees C and is estimated to hold as high as 90% with further development and test. The canister is plumbed in series with the ventilation loop where moisture, CO2 and metabolic heat is transported to the canister. The return gases from the astronaut containing moisture, CO2 and heat are adsorbed in the solid adsorbent. The heat of adsorption gases causes the oxygen to be desorbed from the solid adsorbent. The desorbed oxygen provides a fresh dry source of breathing gas to defog the lens on the helmet. Since the oxygen is dry the sensible heating required to raise the gas to the comfort zone in the electrical comfort heater is minimal. In the event the heat of adsorption of CO2 and moisture is insufficient to release enough oxygen, only 15 watts of electrical energy (in the form of a battery operated electrical heater) is needed to release 0.165 lb/hr of oxygen, the amount needed to satisfy an average metabolic workload of 1000Btu/hr.

It is yet another object of the invention to eliminate the need for high-pressure storage, which presents a considerable safety hazard to the occupant and the handlers. The need for storage of supercritical cryogenic oxygen at high pressure is eliminated through the use of a solid adsorbent bed.

It is still another object of the invention to reclaim and reuse the carbon dioxide and moisture exhaust from the astronaut. The present invention provides a collection and storage device, maintained cold, for collecting and storing the carbon dioxide and moisture as an iced clinker. The collection and storage device is removable from the PLSS so that the vital elements contained in the clinker can be reclaimed aboard the habitat.

These and other features, aspects and advantages of the present invention will become better understood with reference to the following drawings, description and claims.

BRIEF DESCRIPTION OF THE DRAWINGS

FIG. 1a is a depiction of the portable life support system (PLSS) of the present invention being utilized by an astronaut.

FIG. 1b is an exploded, perspective view of the PLSS shown in FIG. 1a.

FIG. 2 is a schematic diagram of the PLSS shown in FIG. 1a.

DETAILED DESCRIPTION OF THE INVENTION

The present invention utilizes solid adsorbent beds for the storage and desorption of cryogenic oxygen. In an embodiment of the invention, the collection and storage of carbon dioxide and moisture expelled from an astronaut during EVA is made by breathe out to a copper wire mesh that is maintained cold by a cryogenic oxygen storage bed. This embodiment provides for optimum ease of maintenance and regeneration of the PLSS, as will be explained below. This embodiment is depicted in the FIGS. 1a–b, 2 and 3.

Figure 1C:
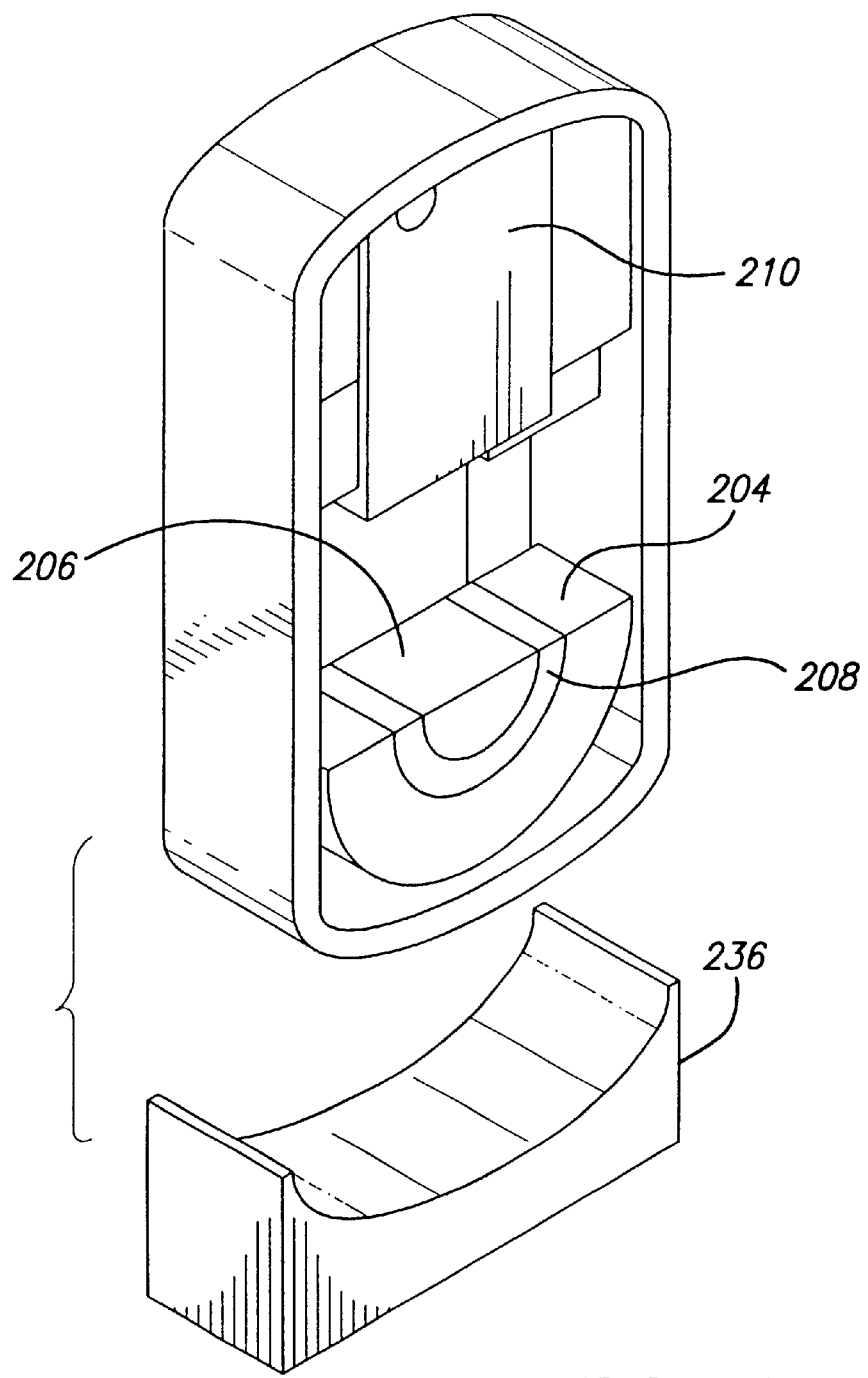
FIG. 1c is a partial assembled view of the PLSS shown in FIG. 1b.

FIG. 1a depicts a portable life support system (PLSS) 100 used in conjunction with an astronaut's spacesuit 200. The PLSS 100 functions to provide both pneumatic pressure to the spacesuit 200, such as at a nominal 3.75 psia, and metabolic oxygen for consumption by the astronaut. These functions are essentially carried out through desorption of cryogenic oxygen stored in a solid adsorbent bed. The PLSS 100 also functions as a thermal regulator to cool an astronaut wearing a hermetically sealed spacesuit. The PLSS 100 is lightweight, compact, efficient, easily rechargeable between EVA and highly reliable. An exploded view of the PLSS 100 is shown in FIG. 1b. The basic components of the PLSS 100 may generally include a primary oxygen supply 204, an emergency oxygen supply 206, a wire mesh 208, and an ice chest 210 further described below.

Figure 2:
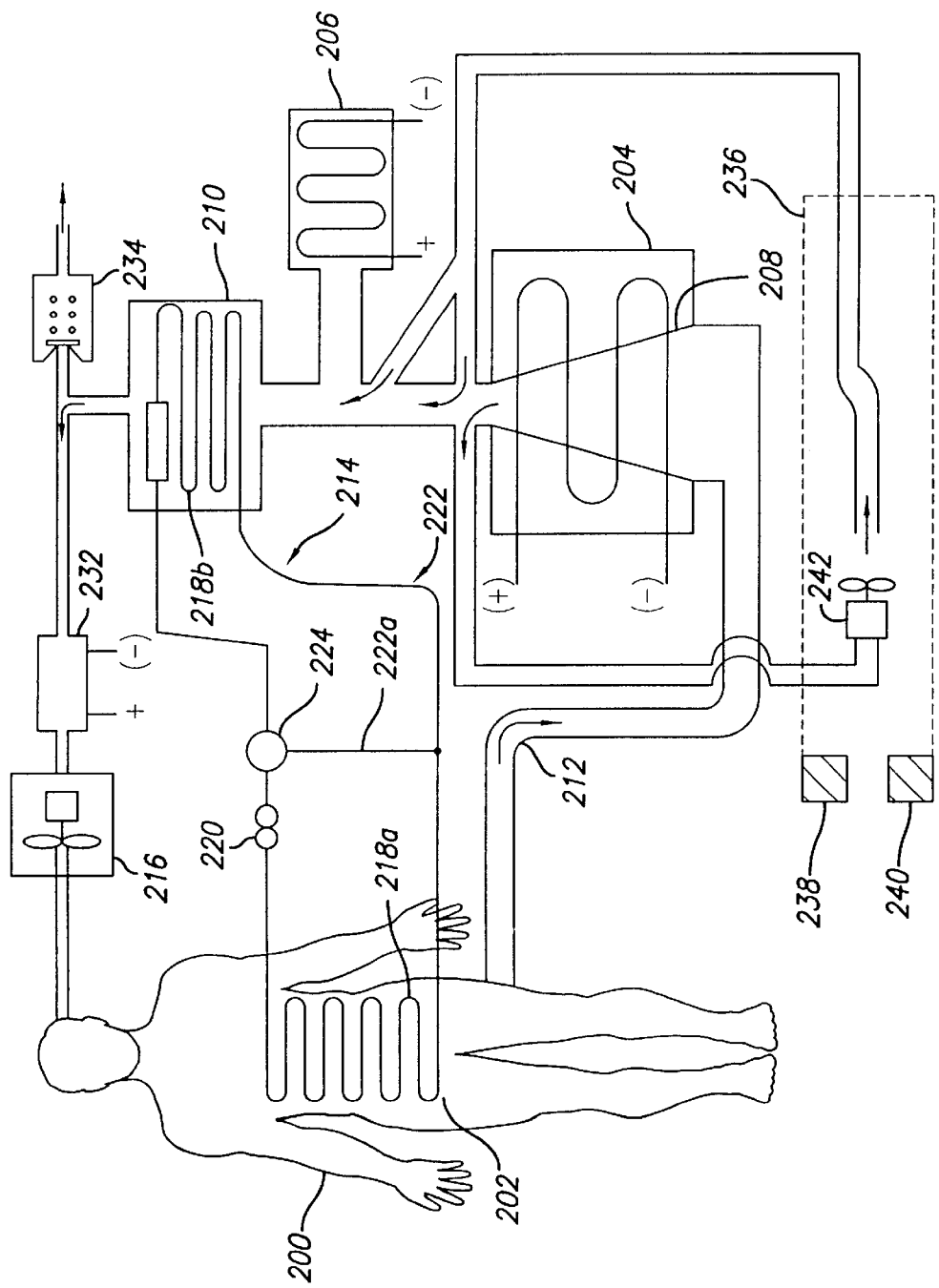

Referring to FIG. 2, a schematic of an embodiment of the PLSS 100 depicts the primary components that may include the spacesuit 200 and a liquid cooled garment 202 that forms a part of the spacesuit 200. The primary oxygen supply 204, the emergency oxygen supply 206, and the wire mesh 208 provide for carbon dioxide and moisture freeze out. The ice chest 210 is used to condition the vent loop media to nominally 32° F. and a dew point of nominally 32° F., and be a heat sink assembly for the liquid cooled garment 202, while a ventilation loop 212 vents oxygen to the spacesuit 200 as well as removing carbon dioxide and moisture from the spacesuit 200. An LCG coolant loop 214 transports suit coolant between the astronaut and the heat sink assembly.

During operation of the PLSS 100, an astronaut wearing the spacesuit 200 may expel carbon dioxide and moisture (recirculated ventilation or exhaust flow) through exhaled breathing and perspiration. The recirculated ventilation or exhaust flow may leave the spacesuit 200 and enter the ventilation loop 212. A fan 216 may create a pressure drop, forcing the exhaust flow to circulate through the ventilation loop 212. The spacesuit 200 exhaust flow may then be piped directly into the wire mesh 208, having a cone-shaped cross-section and made of copper as one example, and in intimate contact with the primary oxygen supply 204 which desorbs oxygen into the recirculated ventilation flow and acts as a heat sink to the exhaust flow, thereby freezing carbon dioxide and moisture, as further described below.

The wire mesh 208 is made of copper to provide good heat conduction to the wall of the primary oxygen storage container. The copper wire mesh is maintained at less than –140° F. to keep the carbon dioxide and moisture frozen. In the wire mesh 208, the frozen carbon dioxide and moisture in the exhaust flow may be collected. The recirculated ventilation exhaust flow may also pass the emergency oxygen supply 206 that may desorb oxygen into the exhaust flow while bypassing the primary oxygen supply 204 and the wire mesh 208, as further described below.

After passing the primary and emergency oxygen supplies 204 and 206, the exhaust flow may pass into an upper or first ice chest 210. The upper ice chest 210 may add heat to the exhaust flow that was cooled by either the primary or emergency oxygen supplies 204 and 206. The ice chest conditions the vent loop oxygen gas exiting the wire mesh 208 to approximately 32° F. to 40° F. with a dew point of 32° F. to 40° F. As described in more detail below, the upper ice chest 210 may also remove heat from the astronaut via a coolant loop 214 having a circuitous network 218a associated with the liquid cooled garment 202, a circuitous network 218b associated with the upper ice chest 210, a pipe 222 connecting the networks 218a and 218b, a pump 220 that pumps a coolant through the coolant loop 214, and a temperature control valve 224 to control the flow of coolant.

From the upper ice chest 210, the exhaust flow may exit at 32° F. to 40° F. with a dew point of 32° F. to 40° F. A comfort heater 232 may heat the recirculated ventilation flow as it moves into the spacesuit 200, such as at a visor area. The vent flow entering the space helmet is directed at the visor to maintain constant defogging on the inner surface of the visor.

A lower ice chest 236 connected in series with the upper ice chest 210 may condition the recirculated ventilation exhaust flow in a manner similar to the upper ice chest and thereby function to increase the longevity of the PLSS 100. The lower ice chest 236 may include a fan 242 to overcome the additional pressure drop of the added ice chest 236. A battery and a radio transceiver may be added as required to accommodate the extended mission duration.

Figure 3:
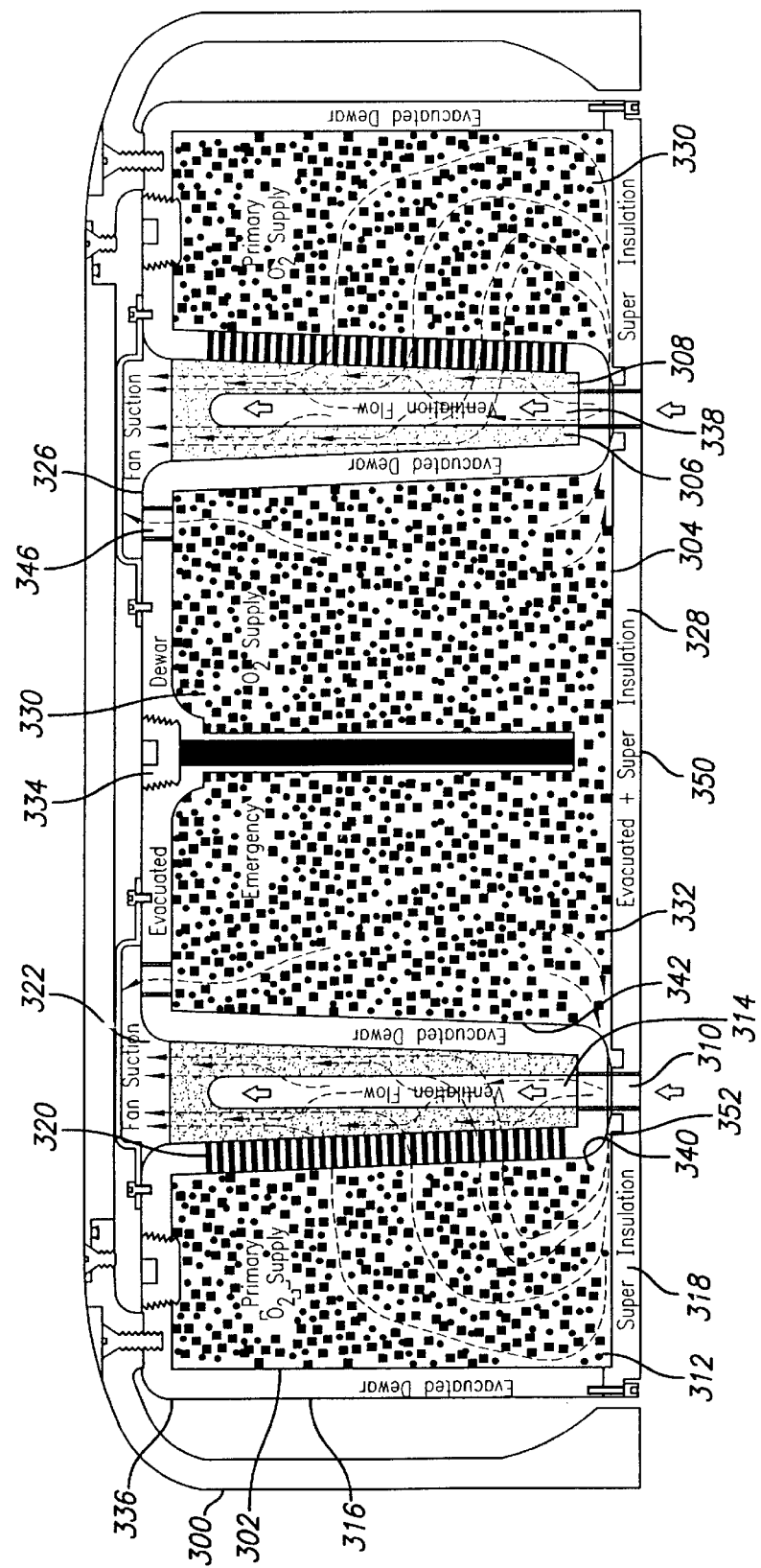
FIG. 3 is a schematic cross sectional diagram of an oxygen supply storage container taken across lines 3—3 of FIG. 1b.

In more specifically describing the above components, in FIG. 3, one embodiment is shown of a chamber 300 having a primary oxygen supply 302 and an emergency oxygen supply 304 therein. The recirculated ventilation exhaust flow may enter the copper wire mesh torus 308 from the ventilation loop (not shown) through a plurality of entrance holes 310 that penetrate the walls of the chamber 300. Although the number, size, and arrangement of the entrance holes 310 may vary, this embodiment provides twenty-four ½ inch diameter holes 310 in a circular arrangement as an example.

Copper, being a good heat conductor, is the preferred material for the wire mesh 308. A primary purpose of the copper wire mesh is to transfer the heat of carbon dioxide and moisture freeze out to the primary oxygen supply 302 by conduction. The copper wire mesh being in contact with the primary dewar 316 transfers the freeze out heat by conduction to the primary solid adsorbent bed 312 and primary oxygen supply contained therein. The solid adsorbent bed may be made of a molecular sieve having a heat of desorption rate for oxygen of 211 BTU/lb of oxygen. The astronaut, through his metabolic activity, is the primary source of heat. Thus, the astronaut's metabolic rate directly affects the amount of oxygen passively desorbed into the PLSS.

The copper wire mesh 308 may be disposed between the primary oxygen supply 302 and the emergency oxygen supply 304. Specifically, the copper wire mesh 308 may be cone-shaped to fit into a tapered cavity between the primary and emergency oxygen supplies 302 and 304. Preferably, the wire mesh 308 may be sized for about twice the volume of anticipated carbon dioxide/moisture freeze-out to preclude plugging and choking of the wire mesh 308 by the frozen carbon dioxide and moisture. Teflon coating of tapered surfaces of primary and emergency oxygen supply walls 340 and 342, respectively, permit easy release and replacement of the wire mesh 308 having frozen carbon dioxide and moisture therein (i.e., frozen clinker) during post-EVA servicing.

The frozen clinker, resulting from use of the PLSS during EVA, may be removed from the PLSS 100 during servicing of the PLSS in the habitat, such as a space vehicle. The wire mesh 308, with its frozen carbon dioxide and moisture, may be interfaced with a Sabatier reactor or similar device where the carbon dioxide is reduced to oxygen and carbon. The oxygen may then be reused for a subsequent mission. The remaining ice clinker may then be thawed, processed and reused as water by an astronaut.

In further describing the wire mesh 308, a center hole 314 may be placed in communication with the entrance holes 310 as well as a center chamber 338 of the wire mesh 308 to maintain a temperature in the center chamber 338 that is above the carbon dioxide and moisture freezing level. Doing so allows for a steady flow of exhaust through a recirculated ventilation exhaust flow collection area 306 that surrounds the center chamber 338 so that carbon dioxide and moisture may freeze in the collection area 306 while maintaining an unfrozen center chamber. This design ensures that the copper wire mesh 308 does not become plugged during EVA. The amount of carbon dioxide and moisture bypassing or avoiding freeze out in the wire mesh and other down stream heat sinks ultimately enters the astronaut's helmet. The design ensures these amounts are below specified limits.

Both oxygen supplies 302 and 304 may be stored at the cryogenic temperature of liquid oxygen (−183° C.). The cryogenic oxygen is retained in a primary solid adsorbent bed 312 and an emergency solid adsorbent bed 330 that respectively form the oxygen supplies 302 and 304. Frozen carbon dioxide (freezing temperature of −140° F. @ 3.19 psia) and ice may be contained in the recirculated ventilation exhaust flow collection area 306 of the wire mesh 308 as a result of cold temperatures from contact with the primary oxygen supply 302 via the walls 340 and 342 (which are preferably non-insulated) of the adjacent primary and emergency oxygen supplies 302 and 304. This results in a freeze-out of the carbon dioxide and moisture.

The heat in the recirculated ventilation exhaust flow is conducted into the primary adsorbent bed 312 of the primary oxygen supply 302 through heat conduction. This may be the primary source of heat used for desorption of the cryogenic oxygen contained in the primary adsorbent bed 312. Heat from other sources may be added to increase the desorption rate (discussed below). The desorbed oxygen supplies pneumatic pressure to the astronaut's spacesuit 200 and necessary oxygen for metabolic consumption by the astronaut. This process is discussed in greater detail below.

The primary adsorbent bed 312 may preferably be made of a carbon molecular sieve (CMS) that adsorbs cryogenic oxygen, for example, at about 73% wt/wt at the cryogenic temperature of −183° C. The high percentage loading results in a size and weight decrease of the PLSS 100 in comparison to a PLSS incorporating a dewar storing liquid oxygen. Such systems require certain cryogenic components such as: fill and shutoff valves, pressure regulating valves, pressure relief valves, heat exchangers for converting liquid oxygen to gaseous oxygen, pressure transducers and miscellaneous tubing, fittings, quick disconnects and couplings. The solid adsorbent, also stored in a dewar, is installed in the pressurized ambient of the pressure suit at nominally 3.75 psia. As a result, the oxygen stays at or close to −183° C. for the entire EVA and the need for certain cryogenic components is eliminated.

The solid adsorbent bed 312 may be cone-shaped and placed inside a primary dewar 316 that may form a part of the primary oxygen supply 302 and that preferably has evacuated primary walls 336. Super insulation 318 may be placed within the evacuated dewar walls 336 to further enhance the insulation of the primary adsorbent bed 312 from external atmospheric effects. Preferably, however, insulation 318 is not placed in the evacuated primary wall 340 adjacent the recirculated ventilation exhaust flow collection area 306 for the purpose of keeping the copper wire mesh cold by conduction.

As seen in FIG. 3, heat contained in the recirculated ventilation flow entering the copper wire mesh 308 may be transferred by conduction to the primary CMS 312 by contact of the copper wire mesh with the inner diameter evacuated wall 340 of the primary oxygen supply dewar 316. The primary oxygen supply 302 may thus exhaust dry, cold, gaseous oxygen through ventilation slots 320 released through desorption of the cryogenic oxygen. The desorbed cryogenic oxygen now in the form of gaseous oxygen may move through the copper wire mesh 308 and, with the assistance of fan suction 322 resulting from fan 216, exit into an ice chest 210 incorporated into the ventilation loop 212. The primary oxygen supply 302 may supply oxygen at an average flow rate of about 0.165 lb/hr, equivalent to a metabolic activity rate of 1000 BTU/hr. The amount of oxygen released is dependent on the activity of the astronaut and performs as a passive control system.

The exhaust heat causing the desorption of oxygen from the primary oxygen supply 302 results not only from the latent heat of the moisture and carbon dioxide expelled by the astronaut, but also from suit loop 214 sensible heat and heat of fusion of the moisture and carbon dioxide. The suit loop sensible heat is transferred from the recirculating suit loop to the oxygen storage bed. The heat of fusion comes from the change in state from gaseous carbon dioxide and moisture at 98° F. to a solid state at −140° F. This heat is ultimately transferred to the cryogenic molecular sieve storage bed where oxygen is desorbed in relation to the amount of heat generated by the astronaut.

An electrical heater 204 may be incorporated in the primary oxygen supply 302 to increase desorption rates in the event pressure decreases to unacceptable levels in the suit. In such instance, a pressure transducer may be situated in the spacesuit 200 to determine the need for increased pressure and to deliver a signal to an electrical control unit (ECU) to generate wattage in the primary oxygen supply 302 heater using battery power. The amount of electrical power required to desorb 0.165 lb/hr of oxygen (rate needed for 1000 BTU/hr metabolic activity) is 15 watts. The heat released by the freeze out of carbon dioxide and moisture produces 7.9 times this much oxygen making use of the heater an unanticipated secondary source. Desorption is consequently increased using the electrical heater and a greater flow of oxygen is delivered to the spacesuit 200. When the pressure transducer senses an increased suit pressure, the transducer may discontinue the signal to the ECU. As can be appreciated, by maintaining the PLSS 100 as a relatively self-contained thermal unit, the need for heavy, bulky electrical equipment is reduced.

Using the cryogenic oxygen as the heat sink for freezing the $CO_2$ and water moisture results in a considerable loss of oxygen to space during each EVA. Approximately 15 percent of the cryogenic oxygen is also used to heat sink the metabolic heat generated by the astronaut. Table 1 summarizes how the primary oxygen is used during an eight hour EVA.

TABLE 1

| | | 8 Hour EVA | | |
|---|---|---|---|---|
| Primary Cryogenic | Metabolic Oxygen | Freeze out | | Reduction In |
| Oxygen, lb $O_2$ | Consumption, lb $O_2$ | $CO_2$, lb $O_2$ | Moisture, lb $O_2$ | Ice Packets, lb (ice) |
| 10.42 | 1.32 | 2.42 | 8.0 | (44.44 − 37.6) = 6.84 −15.39% |

As noted in Table 1, the 2.42+8.0 lb of oxygen needed to freeze out 1.632 lb of $CO_2$ and 1.6 lb of moisture results in 10.42/1.32=7.9 times the metabolic oxygen needed during the eight hour EVA. As a result, 10.42−1.32=9.1 lb of oxygen will be exhausted overboard through the suit pressure relief valve. All is not lost, however, because while exhausting 9.1 lb of oxygen, 1.632 lb of $CO_2$ 1.6 lb of moisture, and 6.84 lb of ice packets are saved, for a total weight of 10.07 lb versus the 9.1 lb of oxygen vented overboard through the relief valve. Means for recovering the 9.1 lb of oxygen needs to be evaluated. For example, if the oxygen leaving the suit pressure relief valve is allowed to enter a downstream CMS adsorbent bed that is held at 3.0 psia by means of a second downstream pressure relief valve, some of the oxygen will be adsorbed before exhausting to the space ambient. The downstream CMS adsorbent bed will need to be cooled to less than −80° C. to make this approach practical.

Locating the suit pressure relief valve at a point upstream of the comfort heater before entering the helmet results in the suit overboard recirculated ventilation flow being close to 100 percent oxygen gas at 32° C. to 40° C. This saves having to heat in the comfort heater what would be exhausted to space. It also simplifies the design of the downstream oxygen salvage adsorbent bed since it will not have to co-adsorb either $CO_2$ or water moisture.

Still referring to FIG. 3, the emergency oxygen supply 304 may be employed on the PLSS 100 in reserve. It may supply oxygen at a contingency flow rate of about 3.6lb in thirty minutes, as an example, to ensure sufficient oxygen supply to the astronaut in the event of a ⅛-inch hole puncture in the astronaut's suit. The emergency oxygen supply 304 may include an evacuated emergency dewar 326 radially within and having a construction similar to the primary oxygen supply dewar 316. Super insulation 328 may be placed within emergency dewar walls 350 to insulate the storage contents from external atmospheric effects. Activation of the emergency oxygen supply 304 may be indicated by low suit 200 pressure.

In the embodiment shown in FIG. 3, the emergency oxygen supply 304 may employ the emergency solid adsorbent bed 330 of CMS able to adsorb cryogenic oxygen at 73% wt/wt at −183° C., for example, similar to the primary oxygen supply 302. An electric heater 332, such as 625 watts, may be incorporated into the emergency adsorbent bed 330. Generation of battery-powered electric heat from the heater 332 may thereby cause the cryogenic oxygen in the emergency bed 330 to desorb. Desorbed gaseous oxygen can then flow directly out of exit holes 346 in the emergency wall 350 to the ice chest 210 incorporated into the ventilation loop 212, bypassing the primary oxygen adsorbent bed 312 and the copper wire mesh 308.

The ice chest 210 may contain a plurality of ice packets. These may be similar to the commonly used blue ice packs.

Use of ice packets, as opposed to ice cubes, facilitates maintenance. Between an EVA, unfrozen ice packets may be removed from compartments of the ice chest 210 and replaced with frozen packets. The self-contained nature of the ice packet 210 makes removal and replacement a relatively easy task at zero gravity.

The ice packets may contain a Teflon sponge on the outer surface to contain frozen water. The vent loop 212 gases passing of the sponge results in a dew point of 32° F. to 40° F. Moisture is absorbed into the gases and oxygen is delivered to the astronaut's helmet with a measure of humidity.

Accordingly, the ice chest 210 may warm the oxygen to 32° F. to 40° F., as a result refreezing ice packets that were thawed by heat from the liquid cooled garment loop. The oxygen supply can then exit the ice chest 210 where the comfort heater provides the final conditioning for the astronaut. The ice chest, which is essentially a heat sink assembly, performs automatic temperature and humidity conditioning of the suit recirculated ventilation flow. As described above, the primary oxygen supply provides the primary heat sink, removing the heat of exhaust through desorption of the primary oxygen from the CMS adsorbent 312 and freezing the carbon dioxide and the moisture expelled by the astronaut. The ice chest 210 conditions the gaseous oxygen before entering the comfort heater making the gaseous oxygen suitable for use by the astronaut.

As also mentioned above, metabolic heat generated by the astronaut is also removed from the spacesuit 200 through the liquid cooled garment (LCG) 202 that pipes coolant through sensitive areas of the suit, as best seen in FIG. 2. The piping 222 may be contained within the LCG 202. The astronaut may transfer metabolic heat to the coolant in the piping 222 through conduction. The piping 222 may establish a circuit between the LCG 202 and the ice chest 210 referred to as the LCG coolant loop 214. The circuitous networks, 218a and 218b, are respectively located at the LCG 202 and the heat sink assembly 210 locations to expand the area for heat transfer. The pump 220 may circulate the coolant through the LCG coolant loop 214. The heat conducted from the astronaut to the coolant in the LCG 202 may then be delivered to the ice chest 210. There, heat may be removed from the coolant by the ice packs in the ice chest 210. The ice packs absorb the heat, cooling the coolant for return to the LCG 202. Upon return to the LCG 202, the astronaut is cooled and metabolic heat is again conducted to the LCG 202 in a continuing, reiterative cycle.

A pipe 222a may cross-circuit the LCG coolant loop 214 through placement between the LCG and heat sink assembly piping networks 218a and 218b. This cross-circuiting pipe 222a can thus provide coolant bypass of the ice chest 210 entirely. The cross-circuiting pipe 222a may provide a level of temperature control to the astronaut. The thermo control valve 224, stationed at the cross-circuiting pipe 222a end that intersects with the return flow to the astronaut, controls the amount of flow bypassing the ice chest 210. By including bypass coolant into the mix of coolant returning to the LCG 202, the astronaut can regulate the temperature of the spacesuit 200. The bypass coolant remains warm from metabolic heat transferred thereto. The astronaut may control the thermo control valve 224 to adjust the incoming coolant temperature.

The pressure relief valve 234 may be situated along the ventilation loop. The pressure relief valve 234 controls suit 200 pressures. If the pressure in the spacesuit 200 becomes too high, the pressure relief valve 234 opens, allowing excess suit pressure to be exhausted to the external atmosphere.

To increase time span of the EVA, a second or add-on ice chest 236 can be included in the PLSS 100 so that the flow leaving the copper wire mesh 308 is first routed to the add-on ice chest 236. The oxygen flow is then routed in series to the first ice chest 210. The combination series of ice chests 210 and 236 may condition the oxygen to 32° F. to 40° F., with the add-on ice chest providing a significant portion of transferred heat. This allows the ice chest 210 to support the LCG coolant loop 214 for a longer period of time. Also contained in the lower ice chest 236 may be an extra battery 238, radio transceiver 240 and fan 242. The fan is used to overcome the added pressure drop resulting from the in-series flow through the two ice chest packets 210 and 236.

The solid-state technology of the present invention is designed to make recharging of the system 100 simple and efficient. To recharge the system 100, a fill port plug 334 centrally located in the emergency oxygen supply dewar 326 is opened at ambient pressure post EVA to provide internal access to the storage area (FIG. 3). An oxygen servicing dewar may reside in the habitat. A slight head pressure can be applied to the servicing dewar to cause a transfer of cryogenic oxygen from the servicing dewar, through the fill port 334, and into the emergency oxygen supply dewar 326. A small opening 352 located between the copper wire mesh 308 and the lower wall of the dewar 326 allows some of the added oxygen to bleed through to the primary oxygen supply 302. When the CMS 330 of the emergency oxygen supply 304 becomes saturated, bleeding of the added oxygen into the primary oxygen supply 302 increases. The CMS 312 of the primary oxygen supply 302 adsorbs the added oxygen. Adsorption of oxygen into the primary CMS 312 produces heat, making the exit temperature of the copper wire mesh 308 warm. When adsorption by primary CMS 312 ends due to saturation, the copper wire mesh 308 exit temperature will begin to approach the temperature of cryogenic oxygen (−183° C.). A built-in temperature sensor (not shown) at the copper wire mesh 308 exit detects the change in temperature, signifying that a full charge of oxygen has been achieved. The servicing dewar is disconnected from the fill port and the fill port plug 334 is reinstalled.

EXAMPLES

Example 1

While the design parameters of the PLSS 100 can be varied, Table 2 below provides one example for the embodiment shown in FIGS. 2 and 3.

TABLE 2

| ESTIMATED WEIGHT OF CMS SOLID ADSORBENT PLSS | | |
|---|---|---|
| | DRY WT., LB. | WET WT., LB. |
| OXYGEN STORAGE CLUSTER (CALC. WT) | 11.14 | 11.14 |
| CMS FOR PRIMARY $O_2$ STORAGE | 14.30 | 14.30 |
| CMS FOR SECONDARY $O_2$ STORAGE | 4.93 | 4.93 |
| PRIMARY OXYGEN PROVIDES: 8-HR METABOLIC OXYGEN CONSUMPTION | | |
| HEAT SINK FOR FREEZEOUT OF $CO_2$ AND MOISTURE | | 10.42 |
| SECONDARY OXYGEN PROVIDES FOR 30 MIN. EMERG. | | 3.60 |
| UPPER ICE-CHEST DEWAR CONSTRUCTION 6 X 9 X 10.6 IN. | | |

TABLE 2-continued

ESTIMATED WEIGHT OF CMS SOLID ADSORBENT PLSS

|  | DRY WT., LB. | WET WT., LB. |
|---|---|---|
| INCLUDES FILTER/MUFFLER (CALC. WT) | 5.00 | 5.00 |
| HEAT SINK ICE PACKETS |  | 18.80 |
| COMFORT HEATER | 1.00 | 1.00 |
| PLSS FAN | 1.00 | 1.00 |
| LCG PUMP | 1.00 | 1.00 |
| LCG TUBING | 1.00 | 1.00 |
| LCG ACCUMULATOR (5 IN$^3$ PLASTIC BAG IN ICE-CHEST) | 0.25 | 0.25 |
| LCG COOLANT (37.4 IN$^3$ OF WATER) |  | 1.35 |
| SUIT PRESSURE RELIEF VALVE | 1.00 | 1.00 |
| PLSS REAR SUIT DOOR STRUCTURE (CALC. WT) | 13.20 | 13.20 |
| 4-HR EVA PACK WEIGHT = | 53.82 LB. | 87.99 LB. |
| ADD-ON LOWER PACK FOR 8-HR EVA |  |  |
| STRUCTURE DEWAR CONSTRUCTION 6 X 6 X 18.5 IN. (CALC. WT) | 6.10 | 6.10 |
| HEAT SINK ICE PACKETS |  | 18.10 |
| ADDITIONAL PLSS FAN IN LOWER PACK | 1.00 | 1.00 |
| 8-HR EVA PACK WEIGHT = | 60.92 LB | 113.89 LB |

NOTE:
WEIGHT ESTIMATE DOES NOT INCLUDE: BATTERIES, RADIO, ECU AND INSTRUMENTATION.

Example 2

The following Table 3 shows an example of the freeze out that may be obtained from the embodiment of the invention shown in FIGS. 2 and 3.

TABLE 3

$CO_2$ AND MOISTURE FREEZEOUT

|  | A | B | C |  |  |
|---|---|---|---|---|---|
| $CO_2$ Freezeout |  |  |  |  |  |
| $CO_2$ Production Based on Metabolic Rate of 1000 Btu/hr (0.204 lb/hr) | Sensible Heat $Q = WC_p \Delta T$ (77° to −140° F.) | Heat of Vaporization (246 Btu/lb) | (77.5 Btu/lb) | Freeze Heatsink Required (A + B + C) | Desorb $O_2$ from CMS Heat of Desorption = 211 Btu/lb Sensible Heat = (−297° to −140° F.) = 35 Btu/lb Total $O_2$ Heatsink = 246 Btu/lb |
| 4-hr EVA 0.816 lb $CO_2$ | 35 Btu | 200 Btu | 63 Btu | 298 Btu | 298 ÷ 246 = 1.21 lb $O_2$ |
| 8-hr EVA 1.632 lb $CO_2$ | 70 Btu | 400 Btu | 126 Btu | 596 Btu | 596 ÷ 246 = 2.42 lb $O_2$ |
| 13-hr EVA 2.652 lb $CO_2$ | 115 Btu | 650 Btu | 205 Btu | 970 Btu | 970 ÷ 246 = 3.94 lb $O_2$ |
| Moisture Freezeout |  |  |  |  |  |
| Moisture Production (0.2 lb/hr) | (77° to −140° F.) | (1000 Btu/lb) | (144 Btu/lb) |  |  |
| 4-hr EVA 0.8 lb $H_2O$ | 80 Btu | 800 Btu | 115 Btu | 995 Btu | 995 ÷ 246 = 4 lb $O_2$ |
| 8-hr EVA 1.6 lb $H_2O$ | 155 Btu | 1600 Btu | 230 Btu | 1985 Btu | 1985 ÷ 246 = 8 lb $O_2$ |
| 13-hr EVA 2.6 lb $H_2O$ | 260 Btu | 2600 Btu | 375 Btu | 3235 Btu | 3235 ÷ 246 = 13 lb $O_2$ |

Example 3

Table 4 shows performance characteristics that may be obtained from the embodiment of the invention shown in FIGS. 2 and 3.

TABLE 4

PRIMARY OXYGEN STORAGE BED

| Oxygen Storage Heatsink Requirements | $O_2$ Req'd to Freezeout, lb | | Total Adsorbed Oxygen Required, lb | CMS Req'd at 73% wt/wt, lb | CMS Volume at 43 lb/ft$^3$, in.$^3$ | Torus Shaped CMS Bed | |
|---|---|---|---|---|---|---|---|
|  | $CO_2$ | Moisture |  |  |  | ID | OD |
| 4-hr EVA | 1.21 | 4.0 | 5.21 | 7.14 | 287 | 11.25 in. (5-in. nominal depth) | 15.3 in. |

TABLE 4-continued

PRIMARY OXYGEN STORAGE BED

| Oxygen Storage Heatsink Requirements | $O_2$ Req'd to Freezeout, lb | | Total Adsorbed Oxygen Required, lb | CMS Req'd at 73% wt/wt, lb | CMS Volume at 43 lb/ft$^3$, in.$^3$ | Torus Shaped CMS Bed | |
|---|---|---|---|---|---|---|---|
| | $CO_2$ | Moisture | | | | ID | OD |
| 8-hr EVA | 2.42 | 8.0 | 10.42 | 14.3 | 575 | 11.25 in (5-in. nominal depth) | 16.3 in. |
| 13-hr EVA | 3.94 | 13.0 | 16.94 | 23.2 | 932 | 11.25 in (5-in. nominal depth) | 19.96 in. |

Example 4

Table 5 includes additional design parameters for the embodiment of the invention shown in FIGS. 2 and 3.

TABLE 5

PORTABLE LIFE SUPPORT SYSTEM (PLSS) PARTICULARS

| | Oxygen Supply | | | | |
|---|---|---|---|---|---|
| EVA Duration | Emerg. Liquid Oxygen, lb | Primary Solid Adsorbent, lb | Size Pri. & Emerg. (Dia × Depth) | Ice Heatsink, in. | Overall PLSS Size, in. |
| 4-hr EVA | 3.6 | 5.2 ($O_2$) 7.1 (CMS) | 15.3-in. dia × 6.0 in. depth | 6 × 9 × 10.6 | 7 × 18.5 × 34.25 |
| 8-hr EVA | 3.6 | 10.4 ($O_2$) 14.2 (CMS) | 16.3-in. dia × 6.0 in. depth | 6 × 9 × 10.6 + 6 × 6 × 15.8 add-on pack | 7 × 18.5 × 34.25 plus add-on pack of 6 × 6 × 15.8 |
| 13-hr EVA | 3.6 | 17 lb ($O_2$) 19 (CMS) | 20-in. dia × 6.0 in. depth | 6 × 9 × 10.6 + 6 × 6 × 15.8 add-on pack | 7 × 21 × 34.25 plus add-on pack of 6 × 13.5 × 15.8 |

Example 5

Table 6 below indicates exemplary ice requirements for the embodiment of the invention shown in FIGS. 2 and 3.

TABLE 6

ICE REQUIREMENTS
BASED ON AN AVERAGE METABOLIC RATE OF 1000 BUT/HR

| EVA | Total Req'd Heat Sink, Btu | Heat Removed by the Primary $O_2$ Heat Sink Freezeout $CO_2$ + Moisture, Btu | Heat Removed by Ice Packets | | | |
|---|---|---|---|---|---|---|
| | | | via LCG, Btu | Amount of Ice at 144 Btu/lb, lb | Volume of Ice at 57 lb/ft$^3$, in.$^3$ | Size of Ice Packet Container, in. |
| 4 hr | 4000 | 298 + 995 | 2707 | 18.8 | 570 | 6 × 9 × 10.6 |
| 8 hr | 8000 | 596 + 1985 | 5419 | 37.6 | 1140 | 6 × 9 × 10.6 + 6 × 6 × 15.8 add-on pack |
| 13 hr | 13,000 | 970 + 3235 | 8795 | 61 | 1852 | 6 × 9 × 10.6 + 6 × 13.5 × 15.8 add-on pack |

It should be understood, of course, that the foregoing relates to preferred embodiments of the invention and that modifications may be made without departing from the spirit and scope of the invention as set forth in the following claims.

I claim:

1. A portable life support system that provides pneumatic pressure to a suit; metabolic oxygen for consumption by a user of said suit, coolant for regulating suit temperature, and collection of carbon dioxide and moisture contained in an recirculated ventilation flow from said user, comprising:
   a primary oxygen supply in thermal communication with said recirculated ventilation flow, said primary oxygen supply having a solid adsorbent bed made of a molecular sieve that adsorbs oxygen at cryogenic temperatures and desorbs oxygen when heated, wherein said primary oxygen supply freezes said carbon dioxide and moisture;
   a wire mesh adjacent to said primary oxygen supply, said wire mesh contains frozen carbon dioxide and moisture;
   a first ice chest downstream of said primary oxygen supply, said first ice chest adjusts temperature and dew point of said exhaust flow;
   a liquid cooled garment associated with said suit, said garment being in thermal communication with said first ice chest;
   a ventilation loop for receiving and delivering said recirculated ventilation flow to said wire mesh, said ventilation loop also delivering said recirculated ventilation flow from said wire mesh to said first ice chest, said ventilation loop also delivering said recirculated ventilation flow from said first ice chest to said suit, whereby said pneumatic pressure is supplied to said suit and said metabolic oxygen is supplied to said user; and
   a coolant loop in communication with said liquid cooled garment and said first ice chest, said coolant loop regulates said suit temperature.

2. The portable life support system of claim 1, wherein the said primary oxygen supply transfers heat to said wire mesh through conduction.

3. The portable life support system of claim 1, further comprising an emergency oxygen supply in communication with said ventilation loop.

4. The portable life support system of claim 3, wherein said emergency oxygen supply comprises a solid adsorbent bed.

5. The portable life support system of claim 4, further comprising an electric heater incorporated into said solid adsorbent bed of said emergency oxygen supply for desorbing said emergency oxygen supply, said electric heater activating upon a received signal indicating low suit pressure.

6. The portable life support system of claim 3, wherein said emergency oxygen supply is in gas communication with said primary oxygen supply.

7. The portable life support system of claim 1, wherein said primary oxygen supply is in gas communication with said recirculated ventilation flow.

8. The portable life support system of claim 1, wherein said wire mesh is removable and replaceable in said system.

9. The portable life support system of claim 8, wherein said wire mesh is cone shaped and disposed between tapered walls of said primary oxygen supply.

10. The portable life support system of claim 1, further comprising a second ice chest upstream of said first ice chest.

11. A portable life support system for use during extra vehicular activities in space, said portable life support system providing pneumatic pressure to a spacesuit, metabolic oxygen for consumption by an astronaut, coolant for regulating spacesuit temperature, and carbon dioxide and moisture removal from an astronaut exhaust, comprising:
   a primary oxygen supply in thermal communication with said astronaut exhaust, said primary oxygen supply having a primary adsorbent bed made of a molecular sieve that adsorbs oxygen at cryogenic temperatures and desorbs oxygen when heated, wherein said primary oxygen supply freezes said carbon dioxide and moisture by said thermal communication;
   an emergency oxygen supply in communication with said ventilation loop;
   a removable wire mesh operatively adjacent to said primary oxygen supply, said wire mesh contains frozen carbon dioxide and moisture and is in oxygen communication with said primary oxygen supply;
   a first ice chest downstream of said primary oxygen supply, said first ice chest conditions said oxygen desorbed from said primary adsorbent bed;
   a liquid cooled garment associated with said spacesuit, said garment being in thermal communication with said first ice chest;
   a ventilation loop for receiving and delivering said astronaut exhaust to said primary oxygen supply, said ventilation loop also delivering said primary oxygen supply from said first ice chest to said spacesuit, whereby said pneumatic pressure is supplied to said spacesuit and metabolic oxygen is supplied to said astronaut; and
   a coolant loop in communication with said liquid cooled garment and first ice chest, said coolant loop regulates said spacesuit temperature.

12. The portable life support system of claim 11, further comprising a second ice chest upstream of said first ice chest.

13. The portable life support system of claim 11, wherein said coolant loop comprises a first circuitous network associated with said liquid cooled garment and a second circuitous network associated with said first ice chest.

14. The portable life support system of claim 11, further comprising a relief valve in the vent loop.

15. The portable life support system of claim 11, further comprising a pump in said coolant loop.

16. A portable life support system that provides pneumatic pressure to a suit, metabolic oxygen for consumption by a user of said suit, coolant for regulating suit temperature, and collection of carbon dioxide and moisture contained in a recirculated ventilation flow from said user, comprising:
   a primary oxygen supply in thermal and gas communication with said recirculated ventilation flow, said primary oxygen supply having a solid adsorbent bed made of a molecular sieve that adsorbs oxygen at cryogenic temperatures and desorbs oxygen when heated, wherein said primary oxygen supply freezes said carbon dioxide and moisture;
   a removable and replaceable cone-shaped wire mesh disposed between and adjacent to tapered walls of said primary oxygen supply, said wire mesh receives heat of conduction from said primary oxygen supply to freeze said carbon dioxide and moisture contained within said wire mesh;
   a first ice chest downstream of said primary oxygen supply, said first ice chest adjusts temperature and dew point of said exhaust flow;

a second ice chest upstream of said first ice chest;

a liquid cooled garment associated with said suit, said garment being in thermal communication with said first ice chest;

a ventilation loop for receiving and delivering said recirculated ventilation flow to said wire mesh, said ventilation loop also delivering said recirculated ventilation flow from said wire mesh to said first ice chest, said ventilation loop also delivering said recirculated ventilation flow from said first ice chest to said suit, whereby said pneumatic pressure is supplied to said suit and said metabolic oxygen is supplied to said user;

an emergency oxygen supply in communication with said ventilation loop and said primary oxygen supply, said emergency oxygen supply having a solid adsorbent bed and an electrical heater incorporated into said solid adsorbent bed of said emergency oxygen supply for desorbing said emergency oxygen supply, said electrical heater activating upon a received signal indicating low suit pressure; and a coolant loop in communication with said liquid cooled garment and said first ice chest, said coolant loop having a first circuitous network associated with said liquid cooled garment and a second circuitous network associated with said first ice chest, said coolant loop regulates said suit temperature.

* * * * *